(12) United States Patent
Cheng

(10) Patent No.: US 7,524,360 B2
(45) Date of Patent: Apr. 28, 2009

(54) METHOD AND APPARATUS FOR FILTERING EXHAUST PARTICULATES

(75) Inventor: Shi-Wai S. Cheng, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 498 days.

(21) Appl. No.: 11/323,997

(22) Filed: Dec. 30, 2005

(65) Prior Publication Data

US 2006/0156702 A1    Jul. 20, 2006

Related U.S. Application Data

(63) Continuation-in-part of application No. 10/763,646, filed on Mar. 3, 2003, now abandoned.

(51) Int. Cl.
B01D 46/00 (2006.01)
F01N 3/022 (2006.01)

(52) U.S. Cl. ............... 95/273; 95/278; 55/282.2; 55/282.3; 55/385.3; 55/523; 55/524; 55/DIG. 5; 55/DIG. 10; 55/DIG. 30; 60/299; 60/311; 428/116

(58) Field of Classification Search ........... 55/282.2, 55/282.3, 385.3, 523, 524, DIG. 5, DIG. 10, 55/DIG. 30; 95/273, 278; 60/297, 299, 303, 60/311; 428/116, 117, 118
See application file for complete search history.

(56) References Cited

U.S. PATENT DOCUMENTS

| | | | |
|---|---|---|---|
| 4,364,761 A | 12/1982 | Berg | 55/523 |
| 4,390,355 A | 6/1983 | Hammond, Jr. | 55/523 |
| 4,423,090 A | 12/1983 | Hammond, Jr. | 427/181 |
| 4,509,966 A | 4/1985 | Dimick | 55/523 |
| 4,704,863 A | 11/1987 | Abthoff | 60/311 |
| 5,051,241 A | 9/1991 | Pfefferle | 422/180 |
| 5,253,476 A | 10/1993 | Levendis | 60/279 |
| 5,294,411 A | 3/1994 | Breuer | 422/174 |
| 5,426,936 A | 6/1995 | Levendis | 60/278 |
| 5,595,581 A * | 1/1997 | Ichikawa et al. | 55/523 |
| 6,800,107 B2 | 10/2004 | Ishihara | 55/523 |
| 6,843,817 B2 | 1/2005 | Noda | 55/282.3 |
| 6,854,265 B2 | 2/2005 | Saito | 55/DIG. 30 |
| 6,890,616 B2 * | 5/2005 | Suwabe et al. | 55/523 |
| 7,008,461 B2 * | 3/2006 | Kuki et al. | 55/282.3 |
| 7,387,657 B2 * | 6/2008 | Kunieda et al. | 55/523 |

(Continued)

FOREIGN PATENT DOCUMENTS

EP    1219794 A1    7/2002

(Continued)

OTHER PUBLICATIONS

European Search Report dated May 4, 2007.

Primary Examiner—Jason M Greene

(57) ABSTRACT

A particulate filter for an exhaust system configured to manage an exhaust flow is disclosed. The particulate filter includes a housing and a wall-filtration element contained therein. The wall-flow filtration element has an inlet end and an outlet end, the outlet end having a first end-plug. The wall-flow filtration element has pores defining a porosity sufficient to trap exhaust particulates and to pass ash particles, including the first end-plug having a pore size equal to or greater than 55 micrometers and equal to or less than 250 micrometers.

20 Claims, 3 Drawing Sheets

U.S. PATENT DOCUMENTS

2005/0175514 A1* 8/2005 Ohno .......................... 55/523
2006/0032203 A1* 2/2006 Komori et al. ................ 55/523
2006/0112669 A1* 6/2006 Yamada et al. ............... 55/523
2007/0119135 A1* 5/2007 Miao et al. ................... 55/523

FOREIGN PATENT DOCUMENTS

WO    WO03/014539    2/2003

* cited by examiner

METHOD AND APPARATUS FOR FILTERING EXHAUST PARTICULATES

CROSS REFERENCE TO RELATED APPLICATIONS

This application is a continuation-in-part application of U.S. application Ser. No. 10/763,646 filed Mar. 3, 2003, now abandoned, which is hereby incorporated by reference in its entirety.

BACKGROUND OF THE INVENTION

The present disclosure relates generally to an exhaust system, and particularly to a particulate filter for an exhaust system.

Automotive exhaust systems for diesel and other internal combustion engines typically include a filtration system that limits the mass of particulate matter emitted with the exhaust gases. In diesel engine systems, this matter typically includes carbonaceous matter (soot) and ash particles. Present filtering methods to trap the exhaust particulates focus on wall-flow filtration. Wall-flow filtration systems typically have a high filtration efficiency not only for exhaust particulates but also for ash particles. Catalytic or thermal arrangements within the exhaust system, which serve to effect regeneration of the filtration element, cannot remove ash particles, thereby increasing the accumulation of ash particles within the filtration body with time. In view of present particulate filter arrangements, it is desirable to have a more advanced particulate filter that can operate with effective filtration and with limited accumulation of ash particles over time.

SUMMARY OF THE INVENTION

An embodiment of the invention includes a particulate filter for an exhaust system configured to manage an exhaust flow. The particulate filter includes a housing and a wall-filtration element contained therein. The wall-flow filtration element has an inlet end and an outlet end, the outlet end having a first end-plug. The wall-flow filtration element has pores defining a porosity sufficient to trap exhaust particulates and to pass ash particles, including the first end-plug having a pore size equal to or greater than 55 micrometers and equal to or less than 250 micrometers.

Another embodiment of the invention includes a particulate filter for an exhaust system configured to manage an exhaust flow. The filter includes a housing having a first end and a second end, and a wall-filtration element arranged within the housing. The wall-flow filtration element includes a ceramic monolith structure having a plurality of porous internal walls defining inlet and outlet channels, the inlet and outlet channels being separated by the porous internal walls to permit exhaust flow through the pores between the inlet and outlet channels. The inlet channel includes an inlet port at one end and a first end-plug at the opposite end, and is configured to receive the exhaust flow at the inlet port, which is arranged at the first end of the housing. The outlet channel includes an outlet port at one end and a second end-plug at the opposite end, and is configured to discharge the exhaust flow at the outlet port, which is arranged at the second end of the housing. The wall-flow filtration element has internal walls with pores defining a porosity sufficient to trap exhaust particulates and ash particles. The first end-plug has a pore size equal to or greater than 55 micrometers and equal to or less than 250 micrometers, and the first end-plug has greater porosity than the second end-plug.

A further embodiment of the invention includes a method for filtering particulates of an exhaust flow of an exhaust system. The exhaust flow is received at one end of a particulate filter having a ceramic monolith structure with porous walls defining inlet channels and outlet channels, the inlet channels each having an inlet port at one end to receive the exhaust flow and a porous plug at the opposite end, the outlet channels each having an outlet port at one end to discharge the exhaust flow and an end plug at the opposite end, the porous plug having a pore size equal to or greater than 55 micrometers, and the porous walls having a pore size equal to or less than 30 micrometers. The exhaust flow is filtered at the ceramic monolith structure as the exhaust flow passes through the porous walls between the inlet and outlet channels. Exhaust byproducts of carbonaceous matter and ash particles are trapped at the porous walls and the end plugs, exhaust byproducts of carbonaceous matter are trapped at the porous plugs, and ash particles are passed through the porous plugs subsequent to a regeneration of the particulate filter. The exhaust flow is discharged at the outlet ports.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a particulate filter for an exhaust system of an automotive diesel engine. While the embodiment described herein depicts an automotive diesel engine as an exemplary diesel powerplant using a particulate filter, it will be appreciated that the disclosed invention may also be applicable to other diesel powerplants that require the functionality of the particulate filter herein disclosed, such as a diesel powered generator for example. While the disclosed invention is well suited for filtering the combustion byproducts of a diesel engine, it may also be applicable for filtering combustion byproducts of a gasoline powered engine.

Figure 1:
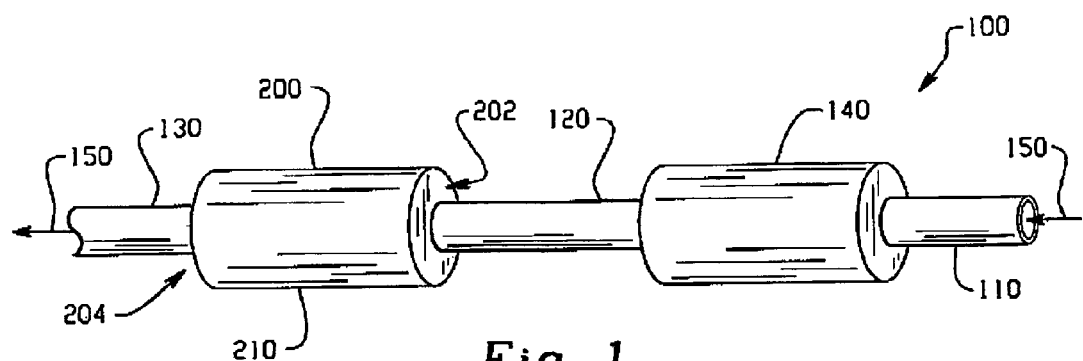
FIG. 1 depicts an exhaust system employing an embodiment of the invention.

An exemplary exhaust system 100 for an automotive diesel engine (not shown) is depicted in FIG. 1 having a manifold exhaust pipe 110 suitably connected at one end to an exhaust manifold (not shown) of the diesel engine (not shown) for receiving an exhaust flow depicted generally as numeral 150. Turbocharger 140 is suitably connected to intermediate manifold exhaust pipe 110 and intermediate exhaust pipe 120. Intermediate exhaust pipe 120 is suitably connected to a particulate filter 200 for trapping exhaust particulates present in the exhaust flow 150, which is suitably connected to an exhaust pipe 130. A tailpipe (not shown) for exhausting the conditioned exhaust flow to atmosphere is suitably connected to exhaust pipe 130. Exhaust system 100 manages the exhaust flow 150 by controlling how the exhaust flow 150 passes from exhaust manifolds (not shown) to manifold exhaust pipe 110, turbocharger 140, intermediate exhaust pipe 120, particulate filter 200, exhaust pipe 130, and then to atmosphere. Exhaust system 100 has a nominal flow area equal to or greater than the inside cross-sectional flow area of manifold exhaust pipe 110.

Figure 2:
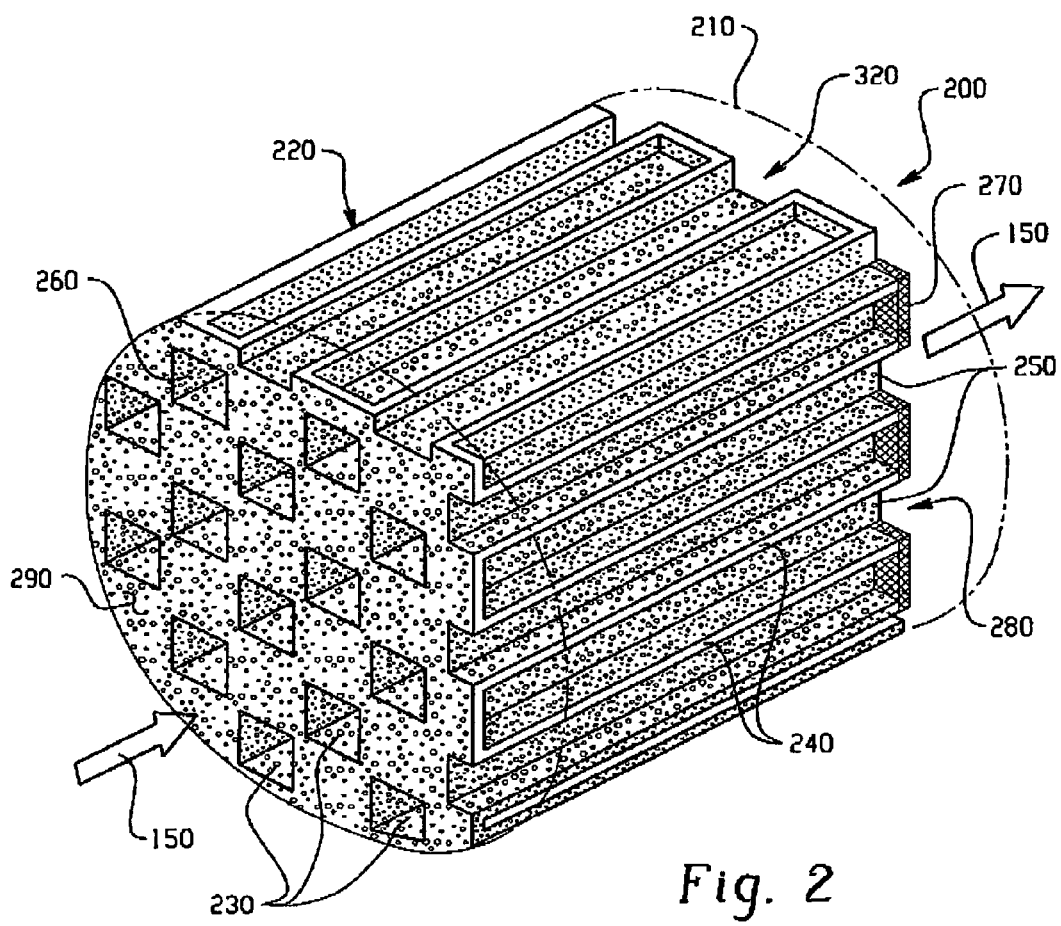
FIG. 2 depicts an isometric view of a particulate filter in accordance with an embodiment of the invention.

Each particulate filter 200 has a housing 210, which may be any form of construction and configuration suitable for the purpose, and a filter element 220 suitably contained within housing 210, best seen by now referring to FIG. 2. In an embodiment, filter element 220 is a ceramic monolith structure. Filter element 220 is of the wall-flow filtration type, meaning that exhaust flow 150 passes from the inlet channels 230, through the porous internal walls 240, to the outlet channels 250. Filtering of the exhaust flow 150 primarily occurs as exhaust flow 150 passes through the pores of internal walls 240, hence the term wall-flow filtration. Filter element 220 is configured to trap exhaust particulates and to pass, or leak, ash particles (accumulated ash particles are depicted generally at 330 in FIG. 3).

Inlet channels 230 each have an inlet port 260 at one end 310 and a porous end-plug 270 at the opposite end 320. Outlet channels 250 each have an outlet port 280 at one end 320 and an end-plug 290 at the opposite end 310. Exhaust flow 150 enters filter element 220 at inlet ports 260, passes through porous internal walls 240, and is discharged from filter element 220 at outlet ports 280. In this manner, inlet channels 230 and outlet channels 250 are referred to as being in fluid communication with each other via internal walls 240. To facilitate the trapping of exhaust particulates within filter element 220, and the leakage of ash particles at porous end-plugs 270 (the leakage of ash particles is depicted generally at arrows 340 in FIG. 3), porous end-plugs 270 are fabricated with a pore size equal to or greater than about 30 micrometers, an embodiment having a pore size on the order of about 30 micrometers to about 60 micrometers, another embodiment having a pore size on the order of about 55 micrometers to about 150 micrometers, and another embodiment having a pore size greater than 150 micrometers to about 250 micrometers. As used herein, pore size is referred to in terms of the average diameter of the pores. Internal walls 240 of filter element 220 are fabricated with a pore size less than about 30 micrometers, thereby enabling the entrapment of exhaust particulates. End-plugs 290 may be solid or may have a porosity similar to that of internal walls 240. In this manner, the artisan will readily recognize that in general, porous end-plugs 270 have a greater porosity than end-plugs 290.

In an embodiment depicted in FIG. 2, filter element 220 is a ceramic monolith structure having a plurality of porous internal walls 240 that define and separate the inlet and outlet channels 230, 250. Inlet and outlet channels 230, 250 are arranged parallel to the direction of exhaust flow 150, resulting in a sideways flow (depicted generally by arrows 300 in FIG. 3) as exhaust flow 150 passes through internal walls 240. Housing 210 includes a first end 310 and a second end 320. Inlet ports 260 and end-plugs 290 are arranged at first end 310, and outlet ports 280 and porous end-plugs 270 are arranged at second end 320. In an embodiment, and as depicted illustratively in FIGS. 2 and 3, the overall surface area of porous end-plugs 270 is substantially less than the total surface area of internal walls 240, with an exemplary ratio being substantially less than about 1:240.

Figure 5:
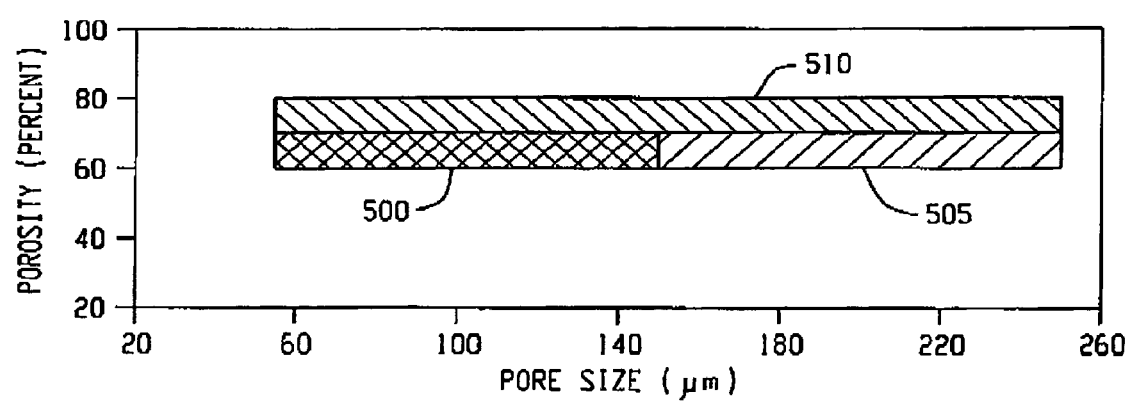
FIG. 5 illustrates a relationship between end-plug porosity and end-plug pore size in accordance with an embodiment of the invention.
Figure 4:
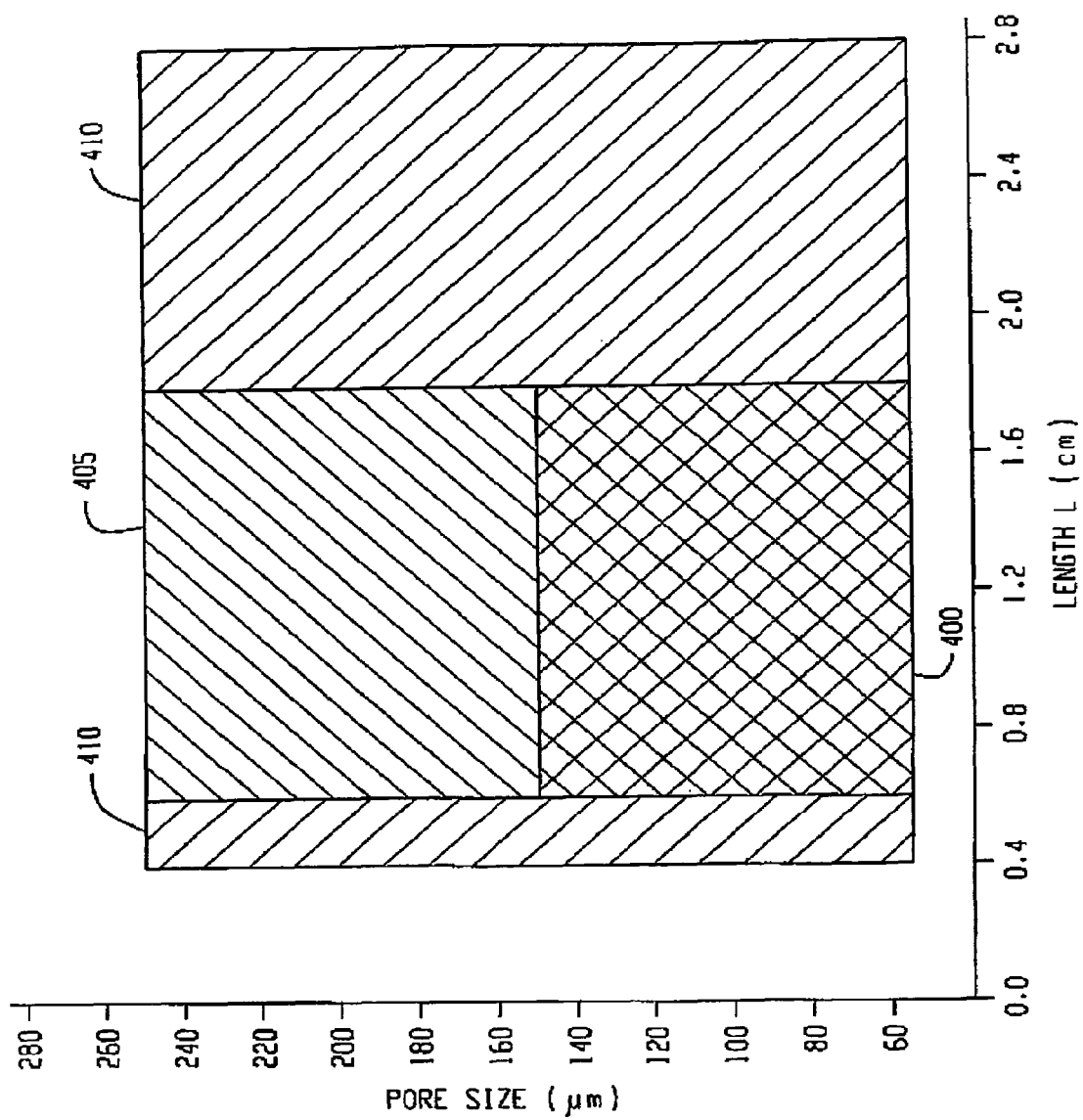
FIG. 4 illustrates a relationship between end-plug pore size and end-plug length in accordance with an embodiment of the invention.

As discussed previously, an embodiment of the invention is configured to trap exhaust particulates and to pass, or leak, ash particles. While some existing particulate filters focus on a high soot-trapping efficiency, an embodiment of the invention disclosed herein focuses on an improved ash-leakage-filtration characteristic. To achieve this characteristic, an appropriate combination of end-plug length L, end-plug porosity, and end-plug pore size, is desired. As discussed previously, and to enable entrapment of exhaust particulates, a pore size of less than about 30 micrometers is desirable for the internal walls 240. Another desirable characteristic of particulate filter 200 is the ability of the filter to form a soot cake on the internal walls 240 while allowing ash leakage through the end-plug 270. To accomplish this balance between soot entrapment and ash leakage, a large pore size and a large porosity for end-plug 270 with an appropriate end-plug length is considered desirable. In experimental testing, it was found that a particulate filter made from a ceramic foam having a pore size of about 250 micrometers was sufficient to form a soot cake on the front face of the filter, which can function as a high efficiency filter. Thus, a large pore size in combination with a suitable length may provide adequate filtration efficiency for carbonaceous particles while allowing smaller ash particles to leak out when the soot cake is burned off after a regeneration. With consideration to this experiment, and in view of the structure of existing particulate filters, it is contemplated that an end-plug 270 having a pore size equal to or greater than 55 micrometers and equal to or less than 150 micrometers, a porosity equal to or greater than 60% and equal to or less than 70%, and an end-plug length L equal to or greater than 0.6 centimeters and equal to or less than 1.8 centimeters, is sufficient to form a soot cake on internal walls 240 while allowing ash leakage through end-plug 270 after a regeneration without excessive pressure drop across the filter. As used herein, the length L denotes the linear distance (as opposed to flow-path distance) across the end-plug material in the direction of flow. The foregoing relationship between end-plug pore size and end-plug length is illustrated by the double cross-hatched region 400 in FIG. 4, and the foregoing relationship between end-plug porosity and end-plug pore size is illustrated by the double cross-hatched region 500 in FIG. 5. Regions 405, 505 in FIGS. 4 and 5, respectively, with positive-sloping lines, are illustrative of an end-plug 270 having a pore size upwards of 250 micrometers (from the aforementioned ceramic foam experiment), and regions 410, 510 with negative-sloping lines represent extended regions relative to regions 400, 405 and regions 500, 505, that are contemplated to have suitable characteristics for an ash-leaking particulate filter.

Figure 3:
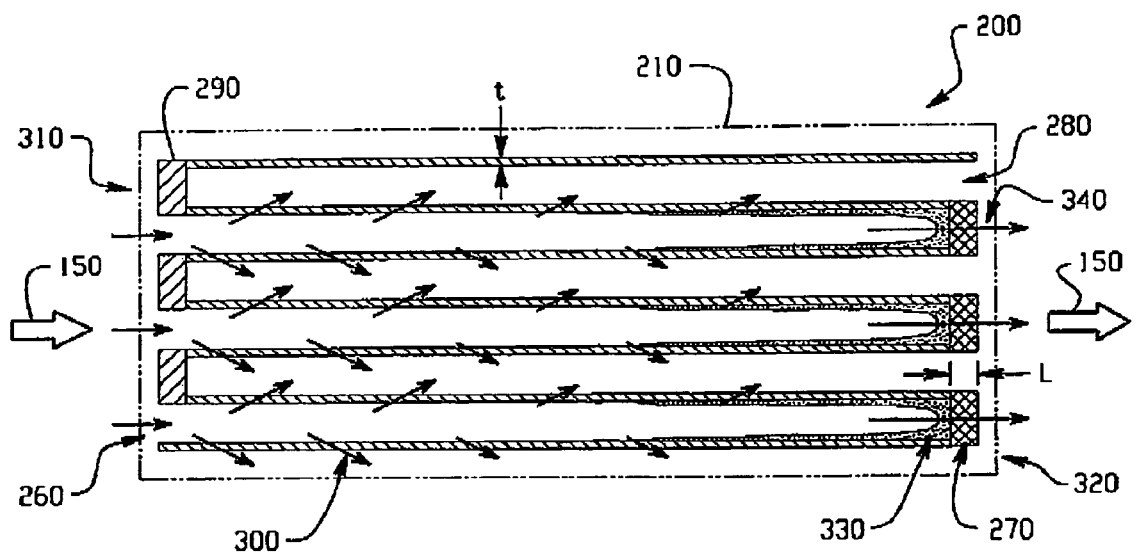
FIG. 3 depicts a cross section view of the particulate filter of FIG. 2.

The process by which particulate filter 200 filters particulates from exhaust flow 150 of exhaust system 100 will now be described with reference to FIGS. 2 and 3. Exhaust flow 150 is received at first end 310 of particulate filter 200, which has a ceramic monolith structure (depicted as 220) with porous walls (depicted as 240) defining inlet channels 230 and outlet channels 250. Inlet channels 230 have inlet ports 260 at first end 310 to receive exhaust flow 150 and porous end-plugs 270 at second end 320 to leak ash (depicted generally at 340). Exhaust flow 150 is in a direction parallel to the inlet and outlet channels 230, 250. The leakage of ash is typically more prevalent after regeneration where catalytic or thermal heating before or within particulate filter 200 burns the carbonaceous part of the exhaust particulates and assists in the separation of ash from soot.

In an embodiment, particulate filter 200 includes a known suitable heating means, such as electrical heater means or fuel burner means, not shown, to supply necessary heat to effect incineration of particles previously trapped by ceramic monolith structure 220 to effect regeneration thereof. Regeneration of ceramic monolith structure 220 serves to convert a substantial portion of the trapped exhaust particulates into ash particles for subsequent leakage through porous end-plugs 270.

Outlet channels 250 have outlet ports 280 at second end 320 to discharge exhaust flow 150 and end-plugs 290 at first end 310 to block the incoming exhaust flow 150. Exhaust flow 150 is filtered at the ceramic monolith structure 220 as it passes through the porous walls 240 between inlet and outlet channels 230, 250. Exhaust byproducts, such as metallic particles and carbonaceous matter, are trapped at porous walls 240, end-plugs 290, and porous end-plugs 270, whereas ash particles are passed, or more specifically leaked, through porous end-plugs 270. The filtered exhaust flow 150 is then discharged at outlet ports 280.

As discussed above, porous end-plugs 270 have a pore size equal to or greater than about 30 micrometers, an embodiment having a pore size equal to or greater than about 30 micrometers and equal to or less than about 60 micrometers, and another embodiment having a pore size upwards of 150 micrometers or more. Porous walls 240 and end-plugs 290, due to the pore size at those locations, do not permit leakage of ash particles. Some data suggests that ash particles will migrate to the closed ends of the inlet channels 230 in a direction toward the end plugs 270. With an embodiment of the porous end plug 270 as disclosed herein, the accumulated ash particles 330 can leak through the end plug 270 after the soot cake on the front face of the end plug 270 is burned off through a regeneration.

As disclosed, an embodiment of the invention provides for ash leakage from particulate filter 200 through porous end-plugs 270, thereby reducing or negating the need for mechanical cleaning of the ash particles from the particulate filter 200.

In an embodiment, the aforementioned ash leakage is achieved after each regeneration of the particulate filter 200. In between regenerations, the accumulation of soot to form a soot cake on the leading face of the filter material serves as an excellent filter by itself. In an embodiment, the large pore size disclosed herein for porous end-plugs 270 will tend to decrease the filtration efficiency before a soot cake is formed. However, after a period of time a soot cake will form. As a result, filtration efficiency of the particulate filter 200 will not be constant, but instead will change (increase) over time. Due to the higher density of the ash particles, the ash particles will migrate to the closed ends (towards porous end-plugs 270), and due to the porosity of the porous end-plugs 270 disclosed herein, it is contemplated that most of the ash particles will leak out after each regeneration.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A particulate filter for an exhaust system configured to manage an exhaust flow, comprising:
   a housing; and
   a wall-flow filtration element contained within the housing, the wall-flow filtration element having an inlet end and an outlet end, the outlet end having a first end-plug;
   wherein the wall-flow filtration element has pores defining a porosity sufficient to trap exhaust particulates and to pass ash particles, including the first end-plug having a pore size equal to or greater than 150 micrometers and equal to or less than 250 micrometers.

2. The particulate filter of claim 1, wherein:
   the first end-plug has a length equal to or greater than 0.4 centimeters and equal to or less than 2.8 centimeters.

3. The particulate filter of claim 2, wherein:
   the first end-plug has a pore size equal to 250 micrometers.

4. The particulate filter of claim 1, wherein:
   the first end-plug has a length equal to or greater than 1.8 centimeters and equal to or less than 2.8 centimeters.

5. The particulate filter of claim 1, wherein:
   the first end-plug has a porosity equal to or greater than 60% and equal to or less than 80%.

6. The particulate filter of claim 5, wherein:
   the first end-plug has a porosity equal to or less than 70%.

7. The particulate filter of claim 3, wherein:
   the first end-plug has a length equal to or greater than 0.6 centimeters and equal to or less than 1.8 centimeters; and
   the first end-plug has a porosity equal to or greater than 60% and equal to or less than 70%.

8. The particulate filter of claim 1, wherein:
   the wall-flow filtration element comprises an inlet channel with an inlet port at the inlet end and the first end-plug at the opposite end, and an outlet channel with an outlet port at the outlet end and a second end-plug at the opposite end;
   the inlet channel being in fluid communication with the outlet channel;
   the wall-flow filtration element arranged to receive the exhaust flow at the inlet port and to discharge the exhaust flow at the outlet port; and
   the first end-plug having greater porosity than the second end-plug.

9. The particulate filter of claim 8, wherein:
   the wall-flow filtration element comprises a ceramic monolith structure having a plurality of porous internal walls defining the inlet and outlet channels, the inlet and outlet channels being separated by the porous internal walls to permit exhaust flow through the pores between the inlet and outlet channels.

10. The particulate filter of claim 9, wherein the total surface area of the first end-plug is less than 1/240 the total surface area of the internal walls.

11. The particulate filter of claim 9, wherein the inlet and outlet channels and the internal walls are arranged parallel to the exhaust flow.

12. A particulate filter for an exhaust system configured to manage an exhaust flow, comprising:
   a housing having a first end and a second end;
   a wall-flow filtration element arranged within the housing comprising a ceramic monolith structure having a plurality of porous internal walls defining inlet and outlet channels, the inlet and outlet channels being separated by the porous internal walls to permit exhaust flow through the pores between the inlet and outlet channels;
   the inlet channel comprising an inlet port at one end and a first end-plug at the opposite end and configured to receive the exhaust flow at the inlet port, the inlet port arranged at the first end of the housing;
   the outlet channel comprising an outlet port at one end and a second end-plug at the opposite end and configured to discharge the exhaust flow at the outlet port, the outlet port arranged at the second end of the housing;

the wall-flow filtration element having internal walls with pores defining a porosity sufficient to trap exhaust particulates and ash particles;

the first end-plug having a pore size equal to or greater than 150 micrometers and equal to or less than 250 micrometers; and the first end-plug having greater porosity than the second end-plug.

13. The particulate filter of claim 12, wherein:

the first end-plug has a porosity equal to or greater than 60% and equal to or less than 80%, and a length equal to or greater than 1.8 centimeters and equal to or less than 2.8 centimeters.

14. The particulate filter of claim 13, wherein:

the first end-plug has a pore size equal to or less than 250 micrometers, a porosity equal to or less than 70%, and a length equal to or less than 1.8 centimeters.

15. A method for filtering particulates of an exhaust flow of an exhaust system, comprising:

receiving the exhaust flow at one end of a particulate filter having a ceramic monolith structure with porous walls defining inlet channels and outlet channels, the inlet channels each having an inlet port at one end to receive the exhaust flow and a porous plug at the opposite end, the outlet channels each having an outlet port at one end to discharge the exhaust flow and an end plug at the opposite end, the porous plug having a pore size equal to or greater than 150 micrometers and equal to or less than 250 micrometers, and the porous walls having a pore size equal to or less than 30 micrometers;

filtering the exhaust flow at the ceramic monolith structure as the exhaust flow passes through the porous walls between the inlet and outlet channels;

trapping exhaust byproducts of carbonaceous matter and ash particles at the porous walls and the end plugs, trapping exhaust byproducts of carbonaceous matter at the porous plugs, and passing ash particles through the porous plugs subsequent to a regeneration of the particulate filter; and discharging the exhaust flow at the outlet ports.

16. The method of claim 15, further comprising:

regenerating the ceramic monolith structure and converting the trapped exhaust particulates into ash particles.

17. The method of claim 15, wherein the trapping further comprises:

trapping ash particles at the porous walls and end plugs.

18. The method of claim 15, wherein the passing further comprises:

passing ash particles through the porous plugs having a pore size equal to 250 micrometers, and having a porosity equal to or greater than 60% and equal to or less than 80%.

19. The method of claim 15, wherein the passing further comprises:

passing ash particles through the porous plugs having a pore size equal to or less than 150 micrometers, and having a porosity equal to or greater than 60% and equal to or less than 70%.

20. The method of claim 15, wherein:

the receiving further comprises receiving the exhaust flow in a direction parallel to the inlet and outlet channels; and the passing further comprises passing ash particles through the porous plugs having a length equal to or greater than 1.8 centimeters and equal to or less than 2.8 centimeters.

* * * * *